(12) United States Patent
Sasada

(10) Patent No.: US 7,483,556 B2
(45) Date of Patent: Jan. 27, 2009

(54) ENERGY SUBTRACTION PROCESSING METHOD AND APPARATUS

(75) Inventor: Ryoji Sasada, Kaisei-machi (JP)

(73) Assignee: FUJIFILM Corporation, Tokyo (JP)

( * ) Notice: Subject to any disclaimer, the term of this patent is extended or adjusted under 35 U.S.C. 154(b) by 556 days.

(21) Appl. No.: 11/111,787

(22) Filed: Apr. 22, 2005

(65) Prior Publication Data

US 2005/0185830 A1 Aug. 25, 2005

Related U.S. Application Data

(62) Division of application No. 10/101,189, filed on Mar. 20, 2002, now Pat. No. 7,248,726.

(30) Foreign Application Priority Data

| Mar. 21, 2001 | (JP) | ............................ 2001-079974 |
| Mar. 27, 2001 | (JP) | ............................ 2001-089346 |
| Feb. 15, 2002 | (JP) | ............................ 2002-037582 |
| Feb. 15, 2002 | (JP) | ............................ 2002-037583 |

(51) Int. Cl.
*H05G 1/64* (2006.01)
*G06K 9/00* (2006.01)

(52) U.S. Cl. .................... 382/128; 378/98.9; 378/98.12

(58) Field of Classification Search ................ 382/128, 382/130–132; 378/98.9, 98.11, 98.12
See application file for complete search history.

(56) References Cited

U.S. PATENT DOCUMENTS

| 4,284,889 A | 8/1981 | Kato et al. |
| 4,346,406 A | 8/1982 | Kato et al. |
| 4,710,875 A * | 12/1987 | Nakajima et al. ........... 378/162 |
| 4,761,739 A | 8/1988 | Shimura |
| 4,855,598 A | 8/1989 | Ohgoda et al. |
| 4,896,037 A | 1/1990 | Shimura et al. |
| 5,049,748 A * | 9/1991 | Ito et al. ..................... 250/584 |
| 5,210,415 A | 5/1993 | Ito |
| 5,633,509 A | 5/1997 | Takeo |
| 6,075,877 A | 6/2000 | Takeo |

FOREIGN PATENT DOCUMENTS

| JP | 61-208976 | 9/1986 |
| JP | 01-214980 | 8/1989 |
| JP | 03-289277 | 12/1991 |
| JP | 08-294054 | 11/1996 |

OTHER PUBLICATIONS

JP Notification of Grounds for Rejection for Application No. 2002-037582 dated Oct. 4, 2005.

* cited by examiner

*Primary Examiner*—Bhavesh M Mehta
*Assistant Examiner*—Manav Seth
(74) *Attorney, Agent, or Firm*—Sughrue Mion, PLLC

(57) ABSTRACT

Radiation image signals representing radiation images of a single object, which have been formed with several kinds of radiation having different energy distributions, are obtained. Energy subtraction processing is performed in accordance with predetermined parameters and on radiation image signal components, which represent corresponding pixels in the radiation images, and a desired tissue pattern embedded in the radiation images is thereby extracted or enhanced. A parameter, which concerns an image density shift quantity over an entire area of an energy subtraction image obtained from the energy subtraction processing, is calculated in accordance with the other parameters.

4 Claims, 5 Drawing Sheets

F I G . 3
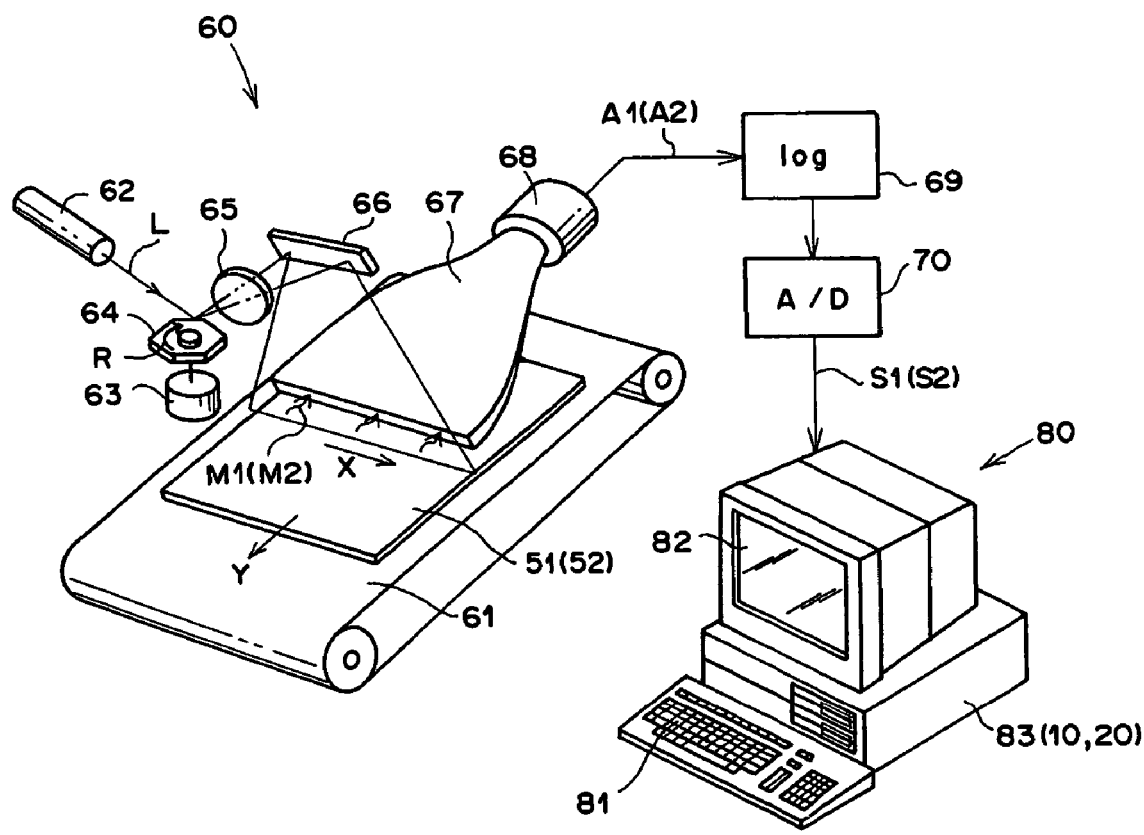

F I G . 5
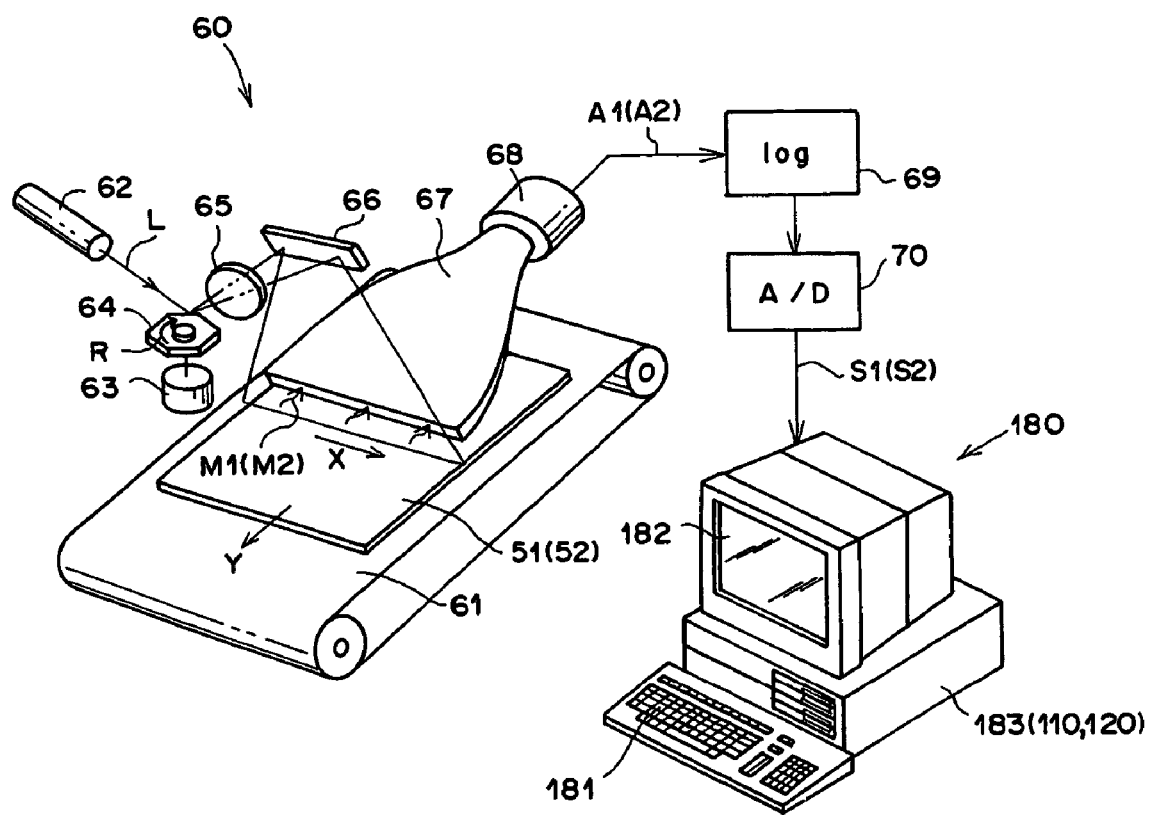

ENERGY SUBTRACTION PROCESSING METHOD AND APPARATUS

This is a divisional of application Ser. No. 10/101,189 filed Mar. 20, 2002 now U.S. Pat. No. 7,248,726.

BACKGROUND OF THE INVENTION

1. Field of the Invention

This invention relates to an energy subtraction processing method and apparatus. This invention particularly relates to an improvement in alteration of parameters for energy subtraction processing.

2. Description of the Related Art

Techniques for photoelectrically reading out a radiation image, which has been recorded on a photographic film, in order to obtain an image signal, carrying out appropriate image processing on the image signal, and then reproducing a visible image by use of the processed image signal have heretofore been known in various fields. For example, an X-ray image is recorded on an X-ray film having a small gamma value chosen according to the type of image processing to be carried out, and the X-ray image is photoelectrically read out from the X-ray film, an electric signal (i.e., an image signal) being thereby obtained. The image signal is converted into a digital image signal. The digital image signal is then processed and used for reproducing the X-ray image as a visible image on a photocopy, or the like. In this manner, a visible image having good image quality with high contrast, high sharpness, high graininess, or the like, can be reproduced.

Further, it has been proposed to use stimulable phosphors in radiation image recording and reproducing systems. Specifically, a radiation image of an object, such as a human body, is recorded on a sheet provided with a layer of the stimulable phosphor (hereinafter referred to as a stimulable phosphor sheet). The stimulable phosphor sheet, on which the radiation image has been stored, is then exposed to stimulating rays, such as a laser beam, which cause the stimulable phosphor sheet to emit light in proportion to the amount of energy stored thereon during its exposure to the radiation. The light emitted by the stimulable phosphor sheet, upon stimulation thereof, is photoelectrically detected and converted into an electric image signal. The image signal is then processed and used for the reproduction of the radiation image of the object as a visible image on a recording material.

In order for an image signal to be detected accurately, certain factors which affect the image signal must be set in accordance with the dose of radiation delivered to the stimulable phosphor sheet, and the like. Novel radiation image recording and reproducing systems which accurately detect an image signal have been proposed. The proposed radiation image recording and reproducing systems are constituted such that a preliminary read-out operation (hereinafter simply referred to as the "preliminary readout") is performed in order to approximately ascertain the radiation image stored on the stimulable phosphor sheet. In the preliminary readout, the stimulable phosphor sheet is scanned with a light beam having a comparatively low energy level, and a preliminary read-out image signal obtained during the preliminary readout is analyzed. Thereafter, a final read-out operation (hereinafter simply referred to as the "final readout") is performed to obtain the image signal, which is to be used during the reproduction of a visible image. In the final readout, the stimulable phosphor sheet is scanned with a light beam having an energy level higher than the energy level of the light beam used in the preliminary readout, and the radiation image is read out with the factors affecting the image signal, which have been adjusted to appropriate values on the basis of the results of an analysis of the preliminary read-out image signal.

The term "read-out conditions" as used hereinafter means a group of various factors, which are adjustable and which affect the relationship between the amount of light emitted by the stimulable phosphor sheet during image readout and the output of a read-out means. For example, the term "read-out conditions" may refer to a read-out gain and a scale factor which define the relationship between the input to the read-out means and the output therefrom, or to the power of the stimulating rays used when the radiation image is read out.

The applicant proposed various methods for setting the read-out conditions without the preliminary readout being carried out. The methods are described in, for example, U.S. Pat. Nos. 4,284,889 and 4,346,406. With the proposed methods for setting the read-out conditions, a stimulable phosphor sheet, on which a radiation image has been stored, is exposed to radiation, and light, which is emitted instantaneously from the stimulable phosphor sheet, is detected with a photodetector. Information, which represents the characteristics of the radiation image, the amount of energy stored on the stimulable phosphor sheet during its exposure to the radiation, or the like, is obtained from the instantaneously emitted light. The read-out conditions are then adjusted in accordance with the obtained information.

Regardless of whether the preliminary readout is or is not carried out, it has also been proposed to analyze the image signal (or the preliminary read-out image signal) obtained and to adjust the image processing conditions, which are to be used when the image signal is processed, on the basis of the results of an analysis of the image signal. The term "image processing conditions" as used herein means a group of various factors, which are adjustable and set when an image signal is subjected to processing that affects the gradation, sensitivity, or the like, of a visible image reproduced from the image signal. In the systems wherein the preliminary readout is not carried out, the image processing conditions also include the read-out gain and the scale factor, which serve as the aforesaid read-out conditions. The proposed method is applicable to cases where an image signal is obtained from a radiation image recorded on a recording medium such as conventional X-ray film, as well as to systems using stimulable phosphor sheets. (In this specification, the system for adjusting the read-out conditions and/or the image processing conditions will often be referred to as the EDR processing system or the EDR processing means. EDR is an acronym for an exposure data recognizer.)

In the radiation image recording and reproducing systems wherein recording media, such as X-ray film or stimulable phosphor sheets, are used, subtraction processing techniques for radiation images are often carried out on image signals detected from a plurality of radiation images of an object, which have been recorded on the recording media.

With the subtraction processing techniques for radiation images, an image is obtained which corresponds to a difference between a plurality of radiation images of an object recorded under different conditions. Specifically, a plurality of the radiation images recorded under different conditions are read out at predetermined sampling intervals, and a plurality of image signals thus detected are converted into digital image signals which represent the radiation images. The image signal components of the digital image signals, which components represent the image information recorded at corresponding sampling points (i.e., picture elements) in the radiation images, are then subtracted from each other. A difference signal is thereby obtained which represents the image of a specific structure or part of the object (hereinbelow also referred to as the pattern of a tissue, a structure, or the like) represented by the radiation images.

Basically, subtraction processing is carried out with either the so-called temporal (time difference) subtraction processing technique or the so-called energy subtraction processing technique. With the temporal (time difference) subtraction processing technique, in order for the image of a specific structure (for example, a blood vessel) of an object to be extracted from the image of the whole object, the image signal representing a radiation image obtained without injection of contrast media is subtracted from the image signal representing a radiation image in which the image of the specific structure (for example, a blood vessel) of the object is enhanced by the injection of contrast media. With the energy subtraction processing technique, such characteristics are utilized that a specific structure of an object exhibits different levels of radiation absorptivity with respect to radiation with different energy distributions. Specifically, an object is exposed to several kinds of radiation with different energy distributions. Alternatively, the energy distribution of the radiation carrying image information of an object, is changed after it has been irradiated onto one of a plurality of radiation image recording media, after which the radiation impinges upon the second radiation image recording medium. In this manner, a plurality of radiation images are obtained in which different images of a specific structure are embedded. Thereafter, the image signals representing the plurality of the radiation images are weighted appropriately and subjected to a subtraction process in order to extract the image of the specific structure. The subtraction process is carried out with Formula (3) shown below. The applicant proposed novel energy subtraction processing methods using stimulable phosphor sheets in, for example, U.S. Pat. Nos. 4,855,598 and 4,896,037.

$$Sproc = Ka \cdot H - Kb \cdot L + Kc \quad (3)$$

wherein Sproc represents the energy subtraction image signal obtained from the energy subtraction processing, Ka and Kb represent the weight factors, Kc represents the bias component, H represents the high energy image signal representing the radiation image recorded with the radiation having a high energy level, and L represents the low energy image signal representing the radiation image recorded with the radiation having a low energy level. (The group of Ka, Kb, and Kc will hereinbelow be referred to as the parameters for the energy subtraction processing.)

In the aforesaid energy subtraction processing, when an object is exposed to radiation having a predetermined energy distribution in the course of recording radiation images of the object, the levels of radiation transmittance vary for different thicknesses of the object. Also, the object exhibits a lower level of radiation transmittance with respect to the low energy components of the radiation than the high energy components thereof. Therefore, as the radiation passes through the object, the energy distribution of the radiation shifts to the high energy side as a whole. Such a phenomenon is referred to as the "beam hardening."

For example, in cases where quantitative determination of a bone mineral in a bone is carried out with the energy subtraction processing, even if the thickness of the bone in the object is the same, the problems described below will occur. Specifically, if the thickness of the soft tissue surrounding the bone is large, the effects of the beam hardening phenomenon will be large, and therefore the image density of the bone pattern in the object image will become low. If the thickness of the soft tissue surrounding the bone is small, the effects of the beam hardening phenomenon will be small, and therefore the image density of the bone pattern in the object image will become high.

If the image density of the extracted tissue pattern fluctuates due to a difference in level of effects of the beam hardening phenomenon, adverse effects will occur on the accuracy of the diagnosis, or the like. Particularly, in cases where an energy subtraction image, which was obtained from energy subtraction processing in the past, and an energy subtraction image, which has currently been obtained from energy subtraction processing, are compared with each other, if there is a difference in level of effects of the beam hardening phenomenon between the two images, there will be the risk that a diseased part is judged by mistake as having been cured.

Further, an energy subtraction image is liable to be affected by scattering of the radiation in the object, and the image quality of the energy subtraction image changes in accordance with the degree of the radiation scattering. Therefore, in order for the image quality of the energy subtraction image to be kept good, it is necessary for the effects of the radiation scattering in the object to be considered.

Therefore, the applicant proposed an energy subtraction processing method wherein, such that the adverse effects of the beam hardening phenomenon may be suppressed, each of the aforesaid parameters Ka, Kb, and Kc for the energy subtraction processing is altered independently in accordance with the thickness of an object or predetermined image processing conditions having a correlation with the thickness of the object. The proposed energy subtraction processing method is described in U.S. Pat. No. 6,075,877.

However, of the parameters described above, the parameter Kc acting as the bias component is the parameter defining the image density shift quantity over the entire area of the energy subtraction image. Therefore, if the parameter Kc is altered independently of the other parameters, there will be the risk that the image density of the entire area of the energy subtraction image will change in accordance with the level of the beam hardening phenomenon.

SUMMARY OF THE INVENTION

The primary object of the present invention is to provide an energy subtraction processing method, wherein adverse effects of a beam hardening phenomenon and scattering of radiation are capable of being suppressed, and an image density of an energy subtraction image obtained from energy subtraction processing is capable of being kept stable.

Another object of the present invention is to provide an energy subtraction processing method, wherein adverse effects of a beam hardening phenomenon and scattering of radiation are capable of being suppressed markedly.

A further object of the present invention is to provide an apparatus for carrying out the energy subtraction processing method.

An energy subtraction processing method and apparatus in accordance with the present invention are characterized by calculating a specific parameter for energy subtraction processing performed in accordance with predetermined parameters, which specific parameter concerns an image density shift quantity over an entire area of an energy subtraction image obtained from the energy subtraction processing, in accordance with the other parameters, whereby adverse effects of a beam hardening phenomenon and scattering of radiation are suppressed, and an image density of the energy subtraction image is kept stable.

Specifically, the present invention provides a first energy subtraction processing method, comprising the steps of:

i) obtaining a plurality of radiation image signals, each of which represents one of a plurality of radiation images of a single object and is made up of a series of image signal components, the plurality of the radiation images of the single object having been formed respectively with a plurality of kinds of radiation having different energy distributions, and ii) performing energy subtraction processing in accordance with predetermined parameters and on image signal components of the radiation image signals, which image signal components represent corresponding pixels in the radiation images, a desired tissue pattern embedded in the radiation images being thereby extracted or enhanced, wherein a parameter, which is among the predetermined parameters and concerns an image density shift quantity over an entire area of an energy subtraction image obtained from the energy subtraction processing, is calculated in accordance with the other parameters, which are among the predetermined parameters and are other than the parameter concerning the image density shift quantity.

In the first energy subtraction processing method in accordance with the present invention, by way of example, the energy subtraction processing in accordance with the predetermined parameters may be performed with Formula (1') shown below.

$$Sproc = Ka \cdot H - Kb \cdot L + Kc \quad (1')$$

wherein Sproc represents the energy subtraction image signal representing the energy subtraction image, H represents the high energy image signal, which is one of the two image signals to be subjected to the energy subtraction processing, L represents the low energy image signal, which is the other image signal to be subjected to the energy subtraction processing, Ka and Kb represent the other parameters (i.e., the weight parameters, and Kc represents the parameter concerning the image density shift quantity.

The term "high energy image signal" as used herein means the image signal representing the radiation image (i.e., the high energy image) having been formed with the radiation, in which high energy components have been enhanced comparatively (or in which low energy components have been suppressed comparatively). Also, the term "low energy image signal" as used herein means the image signal representing the radiation image (i.e., the low energy image) having been formed with the radiation, in which the low energy components have been enhanced comparatively (or in which the high energy components have been suppressed comparatively). By way of example, in the cases of a one-shot energy subtraction processing technique wherein, for example, two stimulable phosphor sheets are superposed one upon the other with an energy separating filter intervening therebetween, and two radiation images of an object are approximately simultaneously formed on the stimulable phosphor sheets with two kinds of radiation having different energy distributions and with a single exposure to radiation, the high energy image signal is obtained from the stimulable phosphor sheet, which is located at a position remote from the object, and the low energy image signal is obtained from the stimulable phosphor sheet, which is located at a position close to the object.

Of the parameters for the energy subtraction processing shown in Formula (1') above, the other parameters Ka and Kb should preferably be Ka(Xu) and Kb(Xu), respectively, calculated in accordance with a smoothed image signal Xu, which is obtained by smoothing either one (H or L) of the two image signals H and L to be subjected to the energy subtraction processing or by smoothing an addition image signal (αH+βL) obtained from an addition of the two image signals H and L to each other. In particular, the other parameters Ka and Kb should preferably be Ka(Lu) and Kb(Lu), respectively, calculated so as to depend upon a smoothed low energy image signal Lu, which is obtained by smoothing the low energy image signal L. In such cases, Formula (1') shown above may be expressed as Formula (1) shown below.

$$Sproc = Ka(Lu) \cdot H - Kb(Lu) \cdot L + Kc \quad (1)$$

wherein Sproc represents the energy subtraction image signal representing the energy subtraction image, H represents the high energy image signal, which is one of the two image signals to be subjected to the energy subtraction processing, L represents the low energy image signal, which is the other image signal to be subjected to the energy subtraction processing, Ka(Lu) and Kb(Lu) represent the weight parameters with respect to the smoothed low energy image signal, and Kc represents the parameter concerning the image density shift quantity.

In cases where the parameter Kc concerning the image density shift quantity is calculated from the other parameters, for example, the parameter Kc concerning the image density shift quantity should preferably be calculated with Formula (2) shown below.

$$Kc = [1 - Ka(Lu) + Kb(Lu)] \times Lu \quad (2)$$

wherein Lu represents the smoothed low energy image signal.

Formula (2) shown above is derived from an operation, wherein the parameters Ka and Kb shown in Formula (1') are calculated (i.e., the parameters Ka(Lu) and Kb(Lu) are calculated) in accordance with the smoothed low energy image signal Lu and wherein, in cases where an energy subtraction image signal representing a soft tissue image (in which the pattern of the soft tissue has been enhanced or extracted) is to be obtained as the energy subtraction image signal Sproc, the image signals in Formula (1) are approximately represented by the formula Sproc=Lu=H=L. In cases where the approximate representation described above is applied, the low energy image signal L before being smoothed should preferably be previously subjected to normalization processing in accordance with image processing conditions, with which the pattern of a desired tissue is capable of being reproduced with optimum gradation. Also, in the same manner, the high energy image signal H should preferably be previously subjected to the normalization processing. The smoothed low energy image signal Lu having been obtained from the smoothing processing may further be subjected to the normalization processing. With the normalization processing described above, the high energy image signal H, the low energy image signal L, and the smoothed low energy image signal Lu are capable of being normalized to the image signals, which represent the images having stable image density and stable contrast and are appropriate for the approximate representation described above.

Also, the parameters Ka(Lu) and Kb(Lu) should preferably be altered in accordance with the ratio between a processing condition for image processing with respect to the low energy image and a processing condition for image processing with respect to the high energy image. By way of example, the ratio between the processing condition for the image processing with respect to the low energy image and the processing condition for the image processing with respect to the high energy image may be the ratio between the conditions with respect to the contrast of the two images subjected to the energy subtraction processing. Specifically, the ratio between the processing condition for the image processing with respect to the low energy image and the processing condition for the image processing with respect to the high energy image may be the ratio between the read-out conditions, which are determined with the normalization processing, such as the EDR processing described above, with respect to the two images subjected to the energy subtraction processing, and/or the ratio between the image processing conditions, which are determined with the normalization processing, such as the EDR processing described above, with respect to the two images subjected to the energy subtraction processing. As the ratio between the read-out conditions or the ratio between the image processing conditions, the ratio between a scale factor value (i.e., a Gp value), which represents the input-output transfer ratio of one of the two radiation image signals with the processing, and the scale factor value (i.e., the Gp value), which represents the input-output transfer ratio of the other radiation image signal with the processing, or the ratio between a latitude value (L value=4/Gp) of the one radiation image signal and the latitude value (the L value) of the other radiation image signal should preferably be employed.

More specifically, in cases where the ratio (=Gp2/Gp1) of the scale factor value Gp2 with respect to the low energy image signal to the scale factor value Gp1 with respect to the high energy image signal becomes high, the parameters Ka(Lu) and Kb(Lu) maybe set to be large. Alternatively, in cases where the ratio (=L2/L1) of the latitude value L2 with respect to the low energy image signal to the latitude value L1 with respect to the high energy image signal becomes low, the parameters Ka(Lu) and Kb(Lu) may be set to be large.

In the first energy subtraction processing method in accordance with the present invention, each of the parameters for the energy subtraction processing need not necessarily take an identical value with respect to all pixels in the images subjected to the energy subtraction processing. The value of each of the parameters should preferably be altered for each of the pixels.

In the above-described first energy subtraction processing method and also in the below-described second energy subtraction processing method and the first and second energy subtraction processing apparatuses according to the present invention, including those defined in claims, the expression of "with a plurality of kinds of radiation having different energy distributions" does not necessarily mean a plurality of separate radiations but includes a plurality of kinds of radiations originated from a single radiation wherein, for example, one is a direct radiation from a radiation source, and the other is a radiation from the same radiation source, which has passed through a recording medium (e.g., a stimulable phosphor sheet) and/or a filter, or the like, and the low energy components of which have been filtered out. Therefore, the plurality of the radiation images can be formed one after another by using different radiations having different energy distributions. Alternatively, the plurality of the radiation images can be formed simultaneously by using a single radiation and placing a plurality of recording media (e.g., stimulable phosphor sheets) one upon another with or without a filter interposed therebetween. When the filter is not used, the stimulable phosphor sheet located closer to the radiation source serves as a filter for filtering out the low energy components of the radiation.

The present invention also provides a first energy subtraction processing apparatus for carrying out the first energy subtraction processing method in accordance with the present invention. Specifically, the present invention also provides a first energy subtraction processing apparatus, comprising:

i) means for obtaining a plurality of radiation image signals, each of which represents one of a plurality of radiation images of a single object and is made up of a series of image signal components, the plurality of the radiation images of the single object having been formed respectively with a plurality of kinds of radiation having different energy distributions, and ii) means for performing energy subtraction processing in accordance with predetermined parameters and on image signal components of the radiation image signals, which image signal components represent corresponding pixels in the radiation images, a desired tissue pattern embedded in the radiation images being thereby extracted or enhanced, wherein the improvement comprises the provision of:

image density parameter calculating means for calculating a parameter, which is among the predetermined parameters and concerns an image density shift quantity over an entire area of an energy subtraction image obtained from the energy subtraction processing, the calculation being made in accordance with the other parameters, which are among the predetermined parameters and are other than the parameter concerning the image density shift quantity.

The first energy subtraction processing apparatus in accordance with the present invention should preferably be modified such that the apparatus further comprises weight parameter calculating means for calculating the other parameters in accordance with a smoothed image signal, which is obtained by smoothing either one of two image signals to be subjected to the energy subtraction processing or by smoothing an addition image signal obtained from an addition of the two image signals to be subjected to the energy subtraction processing to each other. In particular, the first energy subtraction processing apparatus in accordance with the present invention should preferably be modified such that the energy subtraction processing is defined with Formula (1) shown above, and the image density parameter calculating means calculates the parameter, which concerns the image density shift quantity, with Formula (2) shown above.

Also, the first energy subtraction processing apparatus in accordance with the present invention should preferably be modified such that the apparatus further comprises weight parameter altering means for altering the other parameters in accordance with a ratio between processing conditions for image processings with respect to the radiation images, with which processing conditions a pattern of a desired tissue embedded in the respective radiation images is capable of being reproduced with optimum gradation. The weight parameter altering means should more preferably be means for altering the other parameters by taking scale factor values, each of which represents an input-output transfer ratio of each of the radiation image signals, or latitude values of the radiation image signals as the processing conditions.

The present invention further provides a second energy subtraction processing method, comprising the steps of:

i) obtaining a plurality of radiation image signals, each of which represents one of a plurality of radiation images of a single object and is made up of a series of image signal components, the plurality of the radiation images of the single object having been formed respectively with a plurality of kinds of radiation having different energy distributions, and ii) performing energy subtraction processing in accordance with predetermined parameters and on image signal components of the radiation image signals, which image signal components represent corresponding pixels in the radiation images, a desired tissue pattern embedded in the radiation images being thereby extracted or enhanced, wherein the parameters are altered in accordance with signal distributions of main object image areas in the plurality of the radiation images.

In the second energy subtraction processing method in accordance with the present invention, by way of example, the energy subtraction processing in accordance with the predetermined parameters may be performed with Formula (4) shown below.

$$Sproc = Ka \cdot H - Kb \cdot L + Kc \tag{4}$$

wherein Sproc represents the energy subtraction image signal obtained from the energy subtraction processing, Ka and Kb represent the weight factors, Kc represents the bias component, H represents the high energy image signal, and L represents the low energy image signal. (The group of Ka, Kb, and Kc will hereinbelow be referred to as the parameters for the energy subtraction processing.)

In the second energy subtraction processing method in accordance with the present invention, the signal distribution of the main object image area may be the signal distribution of the entire area of the radiation image. Alternatively, the signal distribution of the main object image area may be the signal distribution of a region of interest, which is part of the radiation image.

Also, the expression of "altering parameters in accordance with signal distributions of main object image areas in a plurality of radiation images" as used herein means that the parameters are altered in accordance with a value, which represents the difference among the signal distributions of the plurality of the radiation images. For example, the parameters may be altered in accordance with widths of the signal distributions of the main object image areas in the plurality of the radiation images. Alternatively, the parameters may be altered in accordance with a ratio between the widths of the signal distributions of the main object image areas in the plurality of the radiation images. As another alternative, the parameters may be altered in accordance with, for example, a function in which the signal distribution of the main object image area acts as a variable. The term "width of a signal distribution" as used herein means, for example, the value, which is determined by the scale factor value (i.e., the Gp value) or the latitude value (L value=4/Gp), the width of an image density histogram, or the difference between the maximum image density and the minimum image density of the entire image area or the region of interest.

The present invention still further provides a second energy subtraction processing apparatus for carrying out the second energy subtraction processing method in accordance with the present invention. Specifically, the present invention still further provides a second energy subtraction processing apparatus, comprising:

i) means for obtaining a plurality of radiation image signals, each of which represents one of a plurality of radiation images of a single object and is made up of a series of image signal components, the plurality of the radiation images of the single object having been formed respectively with a plurality of kinds of radiation having different energy distributions, and ii) means for performing energy subtraction processing in accordance with predetermined parameters and on image signal components of the radiation image signals, which image signal components represent corresponding pixels in the radiation images, a desired tissue pattern embedded in the radiation images being thereby extracted or enhanced, wherein the improvement comprises the provision of:
parameter altering means for altering the parameters in accordance with signal distributions of main object image areas in the plurality of the radiation images.

The second energy subtraction processing apparatus in accordance with the present invention may be modified such that the parameter altering means is means for altering the parameters in accordance with widths of the signal distributions of the main object image areas in the plurality of the radiation images. Alternatively, the second energy subtraction processing apparatus in accordance with the present invention may be modified such that the parameter altering means is means for altering the parameters in accordance with a ratio between the widths of the signal distributions of the main object image areas in the plurality of the radiation images.

Also, in the second energy subtraction processing apparatus in accordance with the present invention, the width of the signal distribution of the main object image area may be a value determined by a scale factor value, which represents an input-output transfer ratio of each of the radiation image signals, or by a latitude value of each of the radiation image signals.

In the second energy subtraction processing method and the second energy subtraction processing apparatus in accordance with the present invention, the parameters are not altered in accordance with the signal distribution of the main object image area in only one of the radiation images, and are altered in accordance with the signal distributions of the main object image areas in the plurality of the radiation images.

With the first energy subtraction processing method and the first energy subtraction processing apparatus in accordance with the present invention, the parameter, which is among the predetermined parameters for the energy subtraction processing and concerns the image density shift quantity over the entire area of the energy subtraction image obtained from the energy subtraction processing, is calculated in accordance with the other parameters, which are among the predetermined parameters and are other than the parameter concerning the image density shift quantity. Therefore, adverse effects of the beam hardening phenomenon and the scattering of radiation are capable of being suppressed, and the image density of the energy subtraction image obtained from the energy subtraction processing is capable of being kept stable.

With the second energy subtraction processing method and the second energy subtraction processing apparatus in accordance with the present invention, the parameters for the energy subtraction processing are altered in accordance with the signal distributions of the main object image areas in the plurality of the radiation images. Therefore, the parameters for the energy subtraction processing are capable of being set in accordance with the degree of the adverse effects of the beam hardening phenomenon and the scattering of radiation. Accordingly, the adverse effects of the beam hardening phenomenon and the scattering of radiation upon the energy subtraction processing are capable of being suppressed markedly.

With the second energy subtraction processing method and the second energy subtraction processing apparatus in accordance with the present invention, the parameters for the energy subtraction processing may be altered in accordance with the ratio between the widths of the signal distributions of the main object image areas in the radiation images (particularly, the ratio between the scale factor values, i.e. the Gp values, each of which represents the input-output transfer ratio of each of the radiation image signals, or the ratio between the latitude values, i.e. the L values, of the radiation image signals. In such cases, the adverse effects of the beam hardening phenomenon and the scattering of radiation upon the energy subtraction processing are capable of being suppressed even further.

Specifically, the energy subtraction processing represented by Formula (4) shown above is the operation processing, wherein the contrast of the bone pattern or the soft tissue pattern in the high energy image and the contrast of the bone pattern or the soft tissue pattern in the low energy image are caused to coincide with each other, and the difference between the high energy image signal and the low energy image signal is calculated, the soft tissue pattern or the bone pattern being thereby enhanced or extracted. It may be regarded that the ratio between the contrast of the bone pattern or the soft tissue pattern in the high energy image and the contrast of the bone pattern or the soft tissue pattern in the low energy image has a direct correlation with the parameters Ka and Kb. Also, the ratio between the widths of the signal distributions of the main object image areas in the radiation images (particularly, the ratio between the scale factor values, i.e. the Gp values, of the radiation image signals or the ratio between the latitude values, i.e. the L values, of the radiation image signals) represents the ratio between the contrast of the high energy image and the contrast of the low energy image. Therefore, the ratio between the widths of the signal distributions of the main object image areas in the radiation images, including the degree of the adverse effects of the beam hardening phenomenon and the scattering of radiation, has a correlation with the parameters. Accordingly, with the second energy subtraction processing method and the second energy subtraction processing apparatus in accordance with the present invention, wherein the parameters for the energy subtraction processing are altered in accordance with the ratio between the widths of the signal distributions of the main object image areas in the radiation images, the adverse effects of the beam hardening phenomenon and the scattering of radiation upon the energy subtraction processing are capable of being suppressed even further.

The scale factor value (i.e., the Gp value) and the latitude value (i.e., the L value) are the values, which reflect the thickness of the object, and do not directly reflect the degree of the adverse effects of the beam hardening phenomenon and the scattering of radiation. Therefore, it is considered that the correlation between the scale factor value (i.e., the Gp value) or the latitude value (i.e., the L value) and the parameters will be low. Specifically, with the energy subtraction processing technique proposed in U.S. Pat. No. 6,075,877 described above, in view of the relationship with the thickness of the object, the parameters for the energy subtraction processing are altered in accordance with the image processing condition alone with respect to one of the images subjected to the energy subtraction processing or in accordance with the image processing condition with respect to an image, which is obtained from an arithmetic mean calculating operation performed on two images. However, the degree of correlation of the ratio between the widths of the signal distributions with the parameters Ka and Kb is higher than the degree of correlation of the image processing condition, which is employed in the energy subtraction processing technique proposed in U.S. Pat. No. 6,075,877, with the parameters Ka and Kb. Therefore, with the second energy subtraction processing method and the second energy subtraction processing apparatus in accordance with the present invention, the adverse effects of the beam hardening phenomenon and the scattering of radiation are capable of being suppressed more efficiently than with the energy subtraction processing technique proposed in U.S. Pat. No. 6,075,877.

BRIEF DESCRIPTION OF THE DRAWINGS

FIG. 3 is a perspective view showing an example of a radiation image read-out apparatus and an image processing and displaying apparatus, which contains an image processing unit and the energy subtraction processing apparatus shown in FIG. 1, FIG. 5 is a perspective view showing an example of a radiation image read-out apparatus and an image processing and displaying apparatus, which contains an image processing unit and the energy subtraction processing apparatus shown in FIG. 4.

DESCRIPTION OF THE PREFERRED
EMBODIMENTS

The present invention will hereinbelow be described in further detail with reference to the accompanying drawings.

Figure 1:
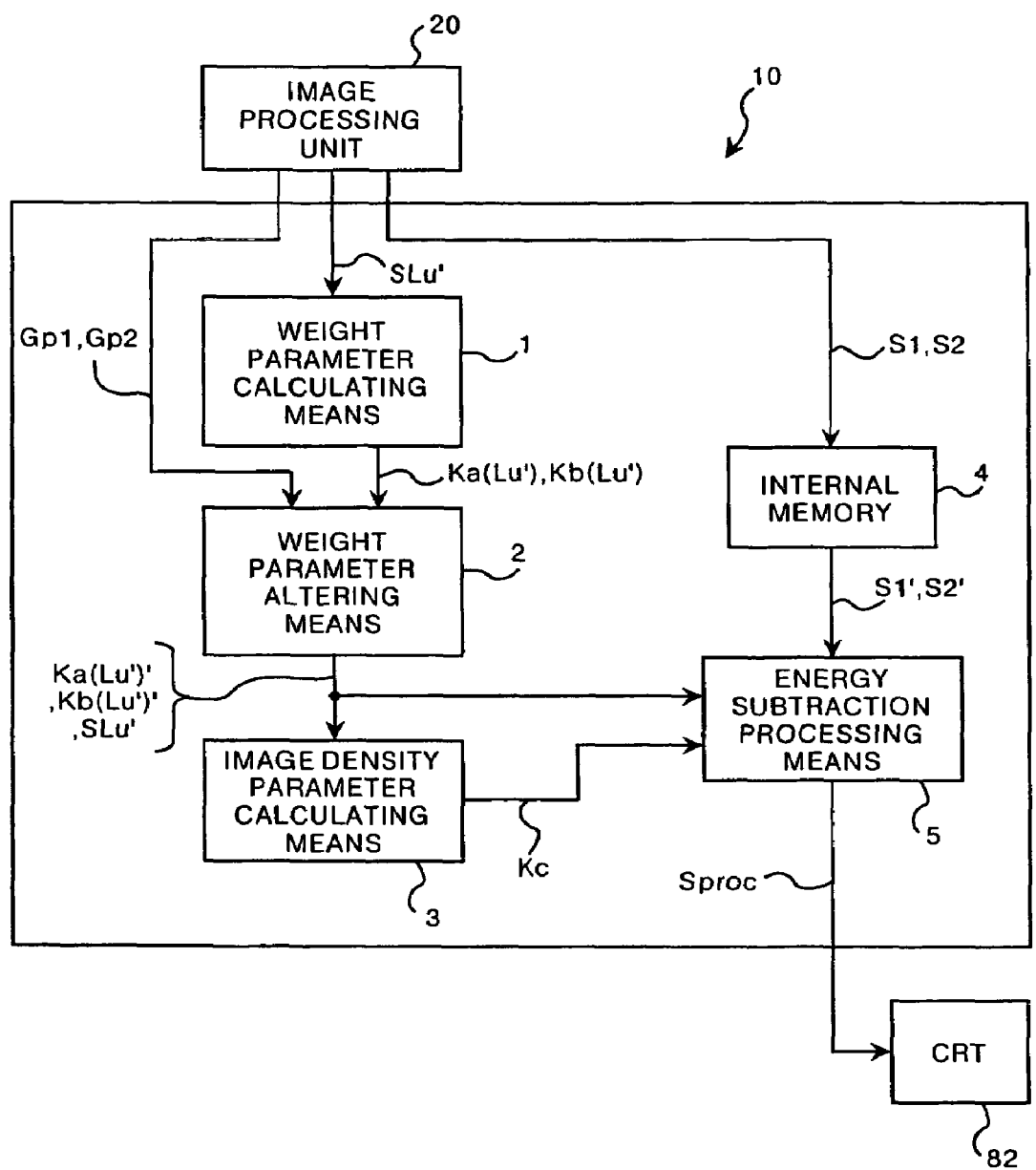
FIG. 1 is a block diagram showing an embodiment of the first energy subtraction processing apparatus in accordance with the present invention.
Figure 2:
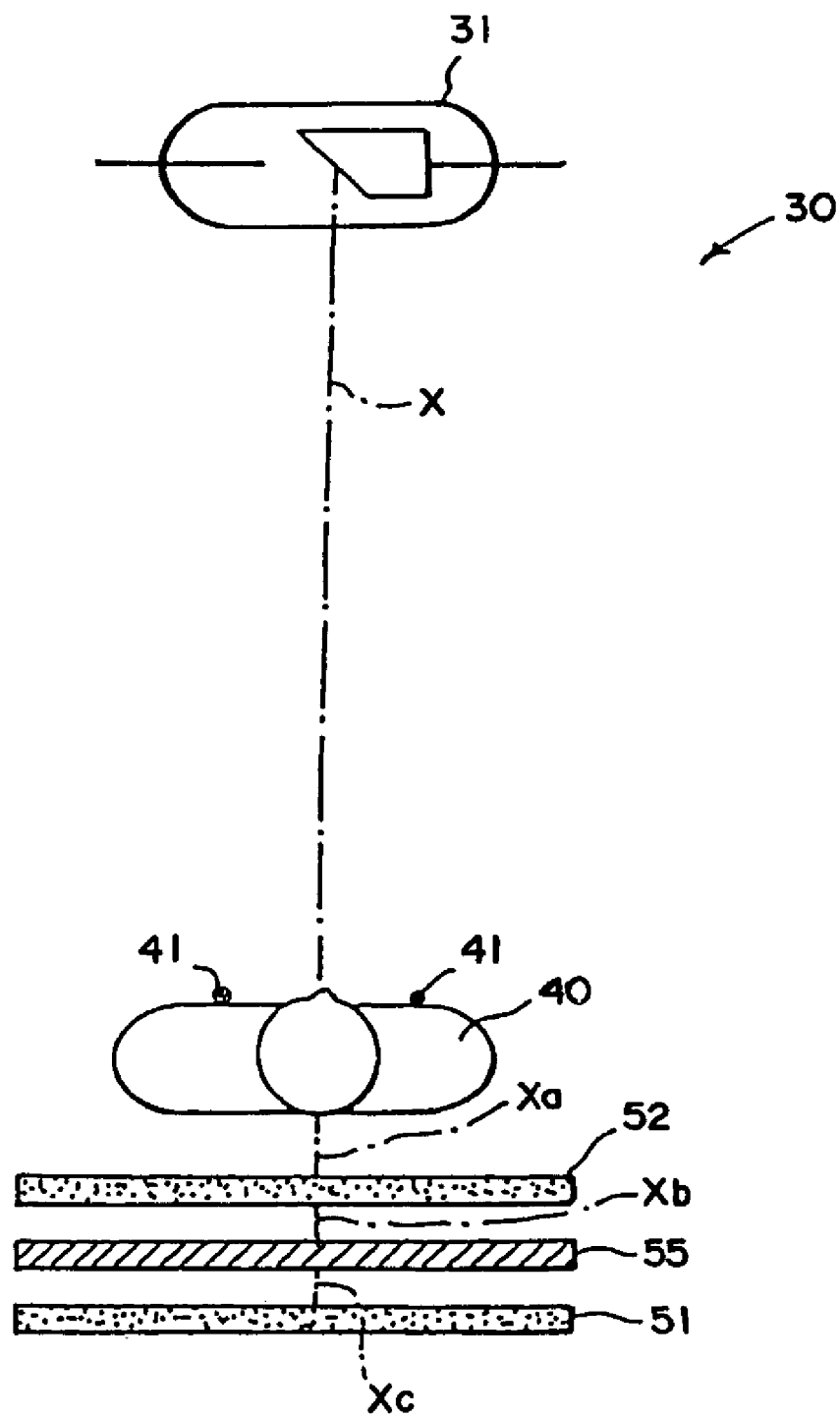
FIG. 2 is a schematic view showing an example of a radiation image recording apparatus.

FIG. 1 is a block diagram showing an embodiment of the first energy subtraction processing apparatus in accordance with the present invention. FIG. 2 is a schematic view showing an example of a radiation image recording apparatus. FIG. 3 is a perspective view showing an example of a radiation image read-out apparatus and an image processing and displaying apparatus, which contains an image processing unit and the energy subtraction processing apparatus shown in FIG. 1.

As illustrated in FIG. 1, an energy subtraction processing apparatus 10 comprises an internal memory 4 for receiving a normalized high energy image signal S1' and a normalized low energy image signal S2' from an external image processing unit 20 and storing the received image signals S1' and S2'. The normalized high energy image signal S1' is obtained from normalization processing performed on a radiation image signal (i.e., a high energy image signal) S1 having been obtained by reading out a radiation image (i.e., a high energy image) P1, which is one of two radiation images P1 and P2 of a single object having been formed respectively with two kinds of radiation having different energy distributions. The high energy image P1 has been formed with the radiation, in which high energy components have been enhanced comparatively. The normalized low energy image signal S2' is obtained from normalization processing performed on a radiation image signal (i.e., a low energy image signal) S2 having been obtained by reading out a radiation image (i.e., a low energy image) P2, which is the other radiation image of the single object. The low energy image P2 has been formed with the radiation, in which low energy components have been enhanced comparatively. The energy subtraction processing apparatus 10 also comprises weight parameter calculating means 1 for receiving a smoothed low energy image signal SLu', which has been obtained from smoothing processing performed on the normalized low energy image signal S2' obtained from the normalization processing of the low energy image signal S2, from the external image processing unit 20. The weight parameter calculating means 1 calculates weight parameters Ka(Lu') and Kb(Lu') for energy subtraction processing in accordance with the smoothed low energy image signal SLu'. The energy subtraction processing apparatus 10 further comprises weight parameter altering means 2 for receiving a scale factor Gp1 of the high energy image signal S1 and a scale factor Gp2 of the low energy image signal S2 from the external image processing unit 20. As the ratio (=Gp2/Gp1) of the scale factor Gp2 to the scale factor Gp1 becomes high, the weight parameter altering means 2 alters the weight parameters Ka(Lu') and Kb(Lu') respectively to new weight parameters Ka(Lu')' and Kb (Lu')'. The energy subtraction processing apparatus 10 still further comprises image density parameter calculating means 3 for calculating an image density shift parameter Kc in accordance with the new weight parameters Ka(Lu')' and Kb(Lu')' and the smoothed low energy image signal SLu'. The energy subtraction processing apparatus 10 also comprises energy subtraction processing means 5 for performing energy subtraction processing on the two normalized image signals S1' and S2', which have been stored in the internal memory 4, in accordance with the new weight parameters Ka(Lu')' and Kb(Lu')' and the image density shift parameter Kc. The energy subtraction processing is performed with Formula (1") shown below.

$$Sproc = Ka(Lu')' \cdot S1' - Kb(Lu')' \cdot S2' + Kc \qquad (1")$$

wherein Sproc represents the energy subtraction image signal obtained from the energy subtraction processing.

The external image processing unit 20 described above receives the high energy image signal S1 and the low energy image signal S2 and forms a histogram, which represents the distribution of the frequency of occurrence with respect to signal levels of each of the high energy image signal S1 and the low energy image signal S2. In accordance with the profiles of the histograms, the external image processing unit 20 recognizes image signal components corresponding to a desired image area and performs the normalization processing (i.e., EDR processing) on the high energy image signal S1 and the low energy image signal S2, such that the desired image area is capable of being reproduced with optimum gradation in an obtained visible image. Also, the external image processing unit 20 performs the smoothing processing on the normalized low energy image signal S2' having been obtained from the normalization processing and thereby calculates the smoothed low energy image signal SLu'. Specifically, the external image processing unit 20 forms the histogram representing the frequency distribution of the high energy image signal S1 and calculates the scale factor Gp1 and a gain Sk1 of the high energy image signal S1 in accordance with the formed histogram of the high energy image signal S1. Also, the external image processing unit 20 performs the normalization processing on the high energy image signal S1 and in accordance with the scale factor Gp1 and the gain Sk1 of the high energy image signal S1 in order to obtain the normalized high energy image signal S1'. Further, the external image processing unit 20 forms the histogram representing the frequency distribution of the low energy image signal S2 and calculates the scale factor Gp2 and a gain Sk2 of the low energy image signal S2 in accordance with the formed histogram of the low energy image signal S2. Furthermore, the external image processing unit 20 performs the normalization processing on the low energy image signal S2 and in accordance with the scale factor Gp2 and the gain Sk2 of the low energy image signal S2 in order to obtain the normalized high energy image signal S2'. The external image processing unit 20 then performs the smoothing processing on the normalized low energy image signal S2' in order to obtain the smoothed low energy image signal SLu'.

The image density parameter calculating means 3 calculates the image density shift parameter Kc, which is to be utilized in Formula (1"), in accordance with the new weight parameters Ka(Lu')' and Kb (Lu')' and the smoothed low energy image signal SLu'. The calculation is made with Formula (2') shown below.

$$Kc = [1 - Ka(Lu')' + Kb(Lu')'] \times SLu' \qquad (2')$$

How the radiation images are recorded will be described hereinbelow. As illustrated in FIG. 2, radiation X is produced by a radiation tube 31 of a radiation image recording apparatus 30 and irradiated to an object 40 (in this example, the chest of a human body). Radiation Xa, which has been irradiated to the object 40 and carries image information of the object 40, impinges upon a second stimulable phosphor sheet 52, which is located at a position close to the object 40. In this manner, the radiation image P2 of the object 40 is stored on the second stimulable phosphor sheet 52. The radiation image P2 is formed with the radiation Xa, which contains a comparatively large amount of the low energy components. Therefore, the radiation image P2 is referred to as the low energy image.

Radiation Xb, which has passed through the second stimulable phosphor sheet 52, then passes through a filter 55 for suppressing the low energy components of the radiation. Radiation Xc, in which the low energy components of the radiation Xb have been suppressed (i.e., in which the high energy components have been enhanced comparatively), emanates from the filter 55. The radiation Xc, in which the high energy components have thus been enhanced comparatively, impinges upon a first stimulable phosphor sheet 51. In this manner, the high energy image P1 of the object 40 is stored on the first stimulable phosphor sheet 51.

During the image recording operation, marks 41, 41 are placed on the object 40. The images of the marks 41, 41 are utilized in the course of matching the positions of the two radiation images P1 and P2 with each other prior to the energy subtraction processing. In the radiation image recording apparatus 30, the radiation images P1 and P2 are stored approximately simultaneously on the first stimulable phosphor sheet 51 and the second stimulable phosphor sheet 52 with a single simultaneous recording operation (i.e., with one shot). Alternatively, the two radiation images may be recorded on a single stimulable phosphor sheet, which comprises two stimulable phosphor layers formed on opposite surfaces and an energy separation filter interleaved as an intermediate layer between the two stimulable phosphor layers. As another alternative, the two radiation images may be recorded one after the other on the two stimulable phosphor sheets and with two independent recording operations (i.e., with two shots).

After the high energy image P1 and the low energy image P2 have been stored respectively on the first stimulable phosphor sheet 51 and the second stimulable phosphor sheet 52 in the radiation image recording apparatus 30 shown in FIG. 2, the first stimulable phosphor sheet 51 and the second stimulable phosphor sheet 52 are placed one after the other at a predetermined position in a radiation image read-out apparatus 60 shown in FIG. 3. How the high energy image P1 is read out from the first stimulable phosphor sheet 51 will be described hereinbelow.

With reference to FIG. 3, after the first stimulable phosphor sheet 51, on which the high energy image P1 has been stored, is set at the predetermined position, the first stimulable phosphor sheet 51 is conveyed in a sub-scanning direction indicated by the arrow Y by sheet conveyance means 61, which may be constituted of an endless belt, or the like, and which is operated by an operating means (not shown). A laser beam L, which serves as stimulating rays, is produced by a laser beam source 62. The laser beam L is reflected and deflected by a rotating polygon mirror 64, which is being quickly rotated by a motor 63 in the direction indicated by the arrow R. The laser beam L then passes through a converging lens 65, which may be constituted of an fθ lens, or the like. The direction of the optical path of the laser beam L is then changed by a mirror 66, and the laser beam L is caused to impinge upon the first stimulable phosphor sheet 51 and scan the first stimulable phosphor sheet 51 in a main scanning direction indicated by the arrow X. The main scanning direction is approximately normal to the sub-scanning direction indicated by the arrow Y. When the first stimulable phosphor sheet 51 is exposed to the laser beam L, the exposed portion of the first stimulable phosphor sheet 51 emits light M1 in an amount proportional to the amount of energy stored thereon during its exposure to the radiation. The emitted light M1 is guided by a light guide member 67, and photoelectrically detected by a photomultiplier 68. In this manner, an analog signal A1 is obtained from the photomultiplier 68.

The analog signal A1, which has been generated by the photomultiplier 68, is logarithmically amplified by a logarithmic amplifier 69, and fed into an analog-to-digital converter 70. The analog-to-digital converter 70 samples the analog signal A1, and the sampled signal is converted into the digital high energy image signal S1. The high energy image signal S1 having thus been obtained is stored in an internal memory (not shown) of the image processing unit 20.

An image processing and displaying apparatus 80 contains the image processing unit 20 and the energy subtraction processing apparatus 10 and carries out various kinds of image processing on image signals. The image processing and displaying apparatus 80 is provided with a keyboard 81, from which various instructions, and the like, are entered, and a CRT display device 82, which displays auxiliary information for instructions and a visible image represented by an image signal. The image processing and displaying apparatus 80 is also provided with a main body 83, which incorporates the image processing unit 20 and the energy subtraction processing apparatus 10 and has other operation processing functions.

Thereafter, in the same manner as that described above, the low energy image signal S2, which represents the low energy image P2 having been stored on the second stimulable phosphor sheet 52, is obtained. The low energy image signal S2 is stored in the internal memory of the image processing unit 20.

The image processing unit 20 performs the normalization processing on the high energy image signal S1 and the low energy image signal S2, which have been stored in the internal memory, in order to obtain the normalized high energy image signal S1' and the normalized low energy image signal S2'. Also, in the course of the normalization processing, the image processing unit 20 obtains the scale factors Gp1 and Gp2. Further, the image processing unit 20 performs the smoothing processing on the normalized low energy image signal S2' in order to calculate the smoothed low energy image signal SLu' and feeds the smoothed low energy image signal SLu' into the weight parameter calculating means 1. Also, the normalized high energy image signal S1' and the normalized low energy image signal S2' are fed from the image processing unit 20 into the internal memory 4 of the energy subtraction processing apparatus 10. Information representing the scale factors Gp1 and Gp2 is fed into the weight parameter altering means 2.

In accordance with the smoothed low energy image signal SLu', the weight parameter calculating means 1 calculates the weight parameters Ka(Lu') and Kb(Lu') for the energy subtraction processing. The weight parameter altering means 2 calculates the ratio (=Gp2/Gp1) of the scale factor Gp2 to the scale factor Gp1. Also, in accordance with the calculated ratio, the weight parameter altering means 2 alters the weight parameters Ka(Lu') and Kb(Lu'), which have been received from the weight parameter calculating means 1, respectively to the new weight parameters Ka(Lu')' and Kb(Lu')'. Information representing the new weight parameters Ka(Lu')' and Kb(Lu')' is fed into the image density parameter calculating means 3 and the energy subtraction processing means 5.

In accordance with the new weight parameters Ka (Lu')' and Kb(Lu')', which have been received from the weight parameter altering means 2, and the smoothed low energy image signal SLu', which has been normalized, the image density parameter calculating means 3 calculates the image density shift parameter Kc with Formula (2') shown above. Also, the image density parameter calculating means 3 feeds the information, which represents the image density shift parameter Kc having been calculated, into the energy subtraction processing means 5.

The energy subtraction processing means 5 receives the normalized high energy image signal S1' and the normalized low energy image signal S2' from the internal memory 4. Also, the energy subtraction processing means 5 calculates the energy subtraction image signal Sproc with Formula (1") shown above by utilizing the new weight parameters Ka(Lu')' and Kb(Lu')', which have been received from the weight parameter altering means 2, and the image density shift parameter Kc, which has been received from the image density parameter calculating means 3.

In the manner described above, the energy subtraction image signal Sproc is calculated in accordance with the parameter Kc concerning the image density shift quantity, which parameter has been calculated in accordance with the new weight parameters (i.e, the other parameters) Ka(Lu')' and Kb(Lu')'. Therefore, the adverse effects of the beam hardening phenomenon and the scattering of radiation are capable of being suppressed, and the image density of an energy subtraction image Pproc, which is represented by the energy subtraction image signal Sproc, is capable of being kept stable.

The energy subtraction image signal Sproc having been obtained in the manner described above is fed into the CRT display device 82 and utilized for reproducing the energy subtraction image Pproc. The thus reproduced energy subtraction image Pproc is a visible image, in which the adverse effects of the beam hardening phenomenon have been suppressed sufficiently, and the image information is reproduced reliably within a predetermined image density range. The energy subtraction image Pproc thus has good image quality and can serve as an effective tool in, particularly, the efficient and accurate diagnosis of an illness.

In the aforesaid embodiment of the first energy subtraction processing apparatus in accordance with the present invention, the weight parameter altering means 2 alters the weight parameters Ka(Lu') and Kb(Lu') in accordance with the ratio (=Gp2/Gp1) of the scale factor Gp2 to the scale factor Gp1. However, the first energy subtraction processing method and the first energy subtraction processing apparatus in accordance with the present invention are not limited to the embodiment described above and may be embodied in various other ways, wherein the other parameters are altered in accordance with the ratio between the processing condition (particularly, the processing condition concerning the contrast) for the image processing with respect to the high energy image signal S1 and the processing condition (particularly, the processing condition concerning the contrast) for the image processing with respect to the low energy image signal S2. For example, the other parameters may be altered in accordance with the ratio between the latitude value (L value=4/Gp) with respect to the high energy image signal S1 and the latitude value (the L value) with respect to the low energy image signal S2. In cases where the other parameters are altered in accordance with the ratio between the latitude values, the other parameters may be altered such that, as the ratio (L2/L1) of the latitude value L2 with respect to the low energy image signal S2 to the latitude value L1 with respect to the high energy image signal S1 becomes low, the weight parameters Ka(Lu') and Kb(Lu') become large.

An embodiment of the second energy subtraction processing apparatus in accordance with the present invention will be described hereinbelow.

Figure 4:
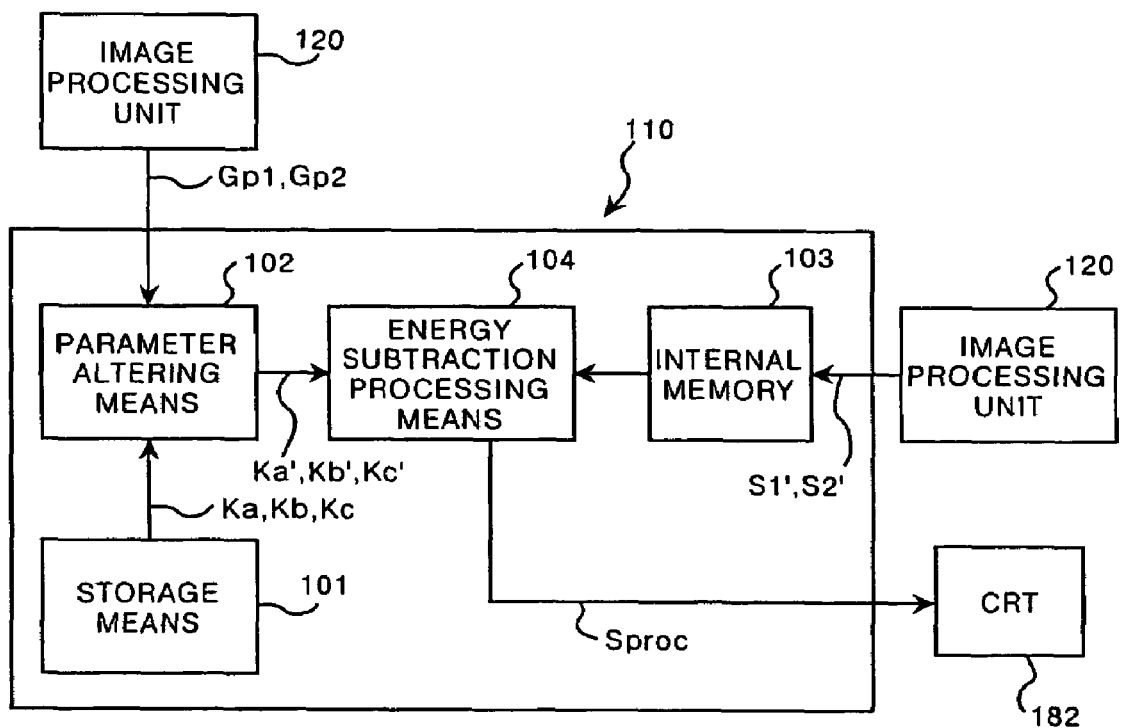
FIG. 4 is a block diagram showing an embodiment of the second energy subtraction processing apparatus in accordance with the present invention.

FIG. 4 is a block diagram showing an embodiment of the second energy subtraction processing apparatus in accordance with the present invention. FIG. 5 is a perspective view showing an example of a radiation image read-out apparatus and an image processing and displaying apparatus, which contains an image processing unit and the energy subtraction processing apparatus shown in FIG. 4.

With reference to FIG. 4, an energy subtraction processing apparatus 110 comprises storage means 101 for storing information representing parameters Ka, Kb, and Kc for the energy subtraction processing, which parameters have been set previously. The energy subtraction processing apparatus 110 also comprises parameter altering means 102 for altering the parameters Ka, Kb, and Kc respectively to new parameters Ka', Kb', and Kc'. The parameters Ka, Kb, and Kc are altered in accordance with the ratio (=Gp2/Gp1) of the scale factor Gp2 to the scale factor Gp1. The information representing the scale factors Gp1 and Gp2 is received from an external image processing unit 120. The energy subtraction processing apparatus 110 further comprises an internal memory 103 for receiving the normalized high energy image signal S1' and the normalized low energy image signal S2' from the external image processing unit 120 and storing the received image signals S1' and S2'. The normalized high energy image signal S1' is obtained from the normalization processing performed on the radiation image signal (i.e., the high energy image signal) S1 having been obtained by reading out the radiation image (i.e., the high energy image) P1, which is one of the two radiation images P1 and P2 of a single object having been formed respectively with two kinds of radiation having different energy distributions. The high energy image P1 has been formed with the radiation, in which the high energy components have been enhanced comparatively. The normalized low energy image signal S2' is obtained from the normalization processing performed on the radiation image signal (i.e., the low energy image signal) S2 having been obtained by reading out the radiation image (i.e., the low energy image) P2, which is the other radiation image of the single object. The low energy image P2 has been formed with the radiation, in which the low energy components have been enhanced comparatively. The energy subtraction processing apparatus 110 still further comprises energy subtraction processing means 104 for performing energy subtraction processing on the two normalized image signals S1' and S2', which have been stored in the internal memory 103, in accordance with the new parameters Ka', Kb', and Kc', which have been obtained from the parameter altering means 102. The energy subtraction processing is performed with Formula (5) shown below.

$$Sproc = Ka' \cdot S1' - Kb' \cdot S2' + Kc' \tag{5}$$

wherein Sproc represents the energy subtraction image signal obtained from the energy subtraction processing.

In the embodiment of the second energy subtraction processing apparatus in accordance with the present invention, instead of being performed on the normalized image signals S1' and S2', the energy subtraction processing may be performed on the image signals S1 and S2 before being subjected to the normalization processing. As another alternative, the energy subtraction processing may be performed on the normalized high energy image signal S1' and a normalized low energy image signal S2'', which has been obtained by correcting the normalized image such that the Gp values coincide with each other. As a further alternative, the energy subtraction processing may be performed on a normalized high energy image signal S1'', which has been obtained by correcting the normalized image such that the Gp values coincide with each other, and the normalized low energy image signal S2'. The normalized high energy image signal S1'' and the normalized low energy image signal S2'' may be represented by the formulas shown below.

$$S1'' = (S1' - 512) \times Gp2/Gp1 + 512$$

$$S2'' = (S2' - 512) \times Gp1/Gp2 + 512$$

The external image processing unit 120 described above receives the high energy image signal S1 and the low energy image signal S2 and forms the histogram, which represents the distribution of the frequency of occurrence with respect to the signal levels of each of the high energy image signal S1 and the low energy image signal S2. In accordance with the profiles of the histograms, the external image processing unit 120 recognizes the image signal components corresponding to a desired image area and performs the normalization processing (i.e., the EDR processing) on the high energy image signal S1 and the low energy image signal S2, such that the desired image area is capable of being reproduced with optimum gradation in an obtained visible image. Specifically, the external image processing unit 120 forms the histogram representing the frequency distribution of the high energy image signal S1 and calculates the scale factor Gp1 and the gain Sk1 of the high energy image signal S1 in accordance with the formed histogram of the high energy image signal S1. Also, the external image processing unit 120 performs the normalization processing on the high energy image signal S1 and in accordance with the scale factor Gp1 and the gain Sk1 of the high energy image signal S1 in order to obtain the normalized high energy image signal S1'. Further, the external image processing unit 120 forms the histogram representing the frequency distribution of the low energy image signal S2 and calculates the scale factor Gp2 and the gain Sk2 of the low energy image signal S2 in accordance with the formed histogram of the low energy image signal S2. Furthermore, the external image processing unit 120 performs the normalization processing on the low energy image signal S2 and in accordance with the scale factor Gp2 and the gain Sk2 of the low energy image signal S2 in order to obtain the normalized high energy image signal S2'. (The normalization processing is described in, for example, Japanese Unexamined Patent Publication No. 4(1992)-51229.)

The parameters Ka, Kb, and Kc, which have been stored previously in the storage means 101, are the parameters having been set such that the energy subtraction image signal Sproc representing, for example, an energy subtraction image, in which the bone pattern has been erased or suppressed and primarily the soft tissue pattern alone is illustrated, may be obtained from the high energy image signal S1 and the low energy image signal S2 representing the radiation images of an object having a standard body form. When the parameters Ka, Kb, and Kc are to be altered by the parameter altering means 102, reference is made to a look-up table with respect to each of the parameters Ka, Kb, and Kc, which look-up table has been stored in the parameter altering means 102 and represents a correspondence relationship between each of the parameters Ka, Kb, and Kc and the ratio between the scale factors Gp1 and Gp2, and the parameters Ka, Kb, and Kc are thereby replaced by the new parameters Ka', Kb', and Kc'. The look-up table has been set with the characteristics such that, as the ratio (Gp2/Gp1) of the scale factor Gp2 to the scale factor Gp1 becomes high, the values of the parameters Ka and Kb become large, and with the characteristics such that, as the ratio (Gp2/Gp1) of the scale factor Gp2 to the scale factor Gp1 becomes high, the value of the parameter Kc becomes small.

In the same manner as that described above with reference to FIG. 2, the high energy image P1 and the low energy image P2 have been stored respectively on the first stimulable phosphor sheet 51 and the second stimulable phosphor sheet 52 in the radiation image recording apparatus 30 shown in FIG. 2. Thereafter, as illustrated in FIG. 5, the first stimulable phosphor sheet 51 and the second stimulable phosphor sheet 52 are placed one after the other at the predetermined position in the radiation image read-out apparatus 60. In FIG. 5, similar elements are numbered with the same reference numerals with respect to FIG. 3. The readout of the high energy image P1 from the first stimulable phosphor sheet 51 is performed in the same manner as that described above with reference to FIG. 3.

The analog signal A1, which has been generated by the photomultiplier 68, is logarithmically amplified by the logarithmic amplifier 69, and fed into the analog-to-digital converter 70. The analog-to-digital converter 70 samples the analog signal A1, and the sampled signal is converted into the digital high energy image signal S1. The high energy image signal S1 having thus been obtained is stored in an internal memory (not shown) of the image processing unit 120.

An image processing and displaying apparatus 180 contains the image processing unit 120 and the energy subtraction processing apparatus 110 and carries out various kinds of image processing on image signals. The image processing and displaying apparatus 180 is provided with a keyboard 181, from which various instructions, and the like, are entered, and a CRT display device 182, which displays auxiliary information for instructions and a visible image represented by an image signal. The image processing and displaying apparatus 180 is also provided with a main body 183, which incorporates the image processing unit 120 and the energy subtraction processing apparatus 110 and has other operation processing functions.

Thereafter, in the same manner as that described above, the low energy image signal S2, which represents the low energy image P2 having been stored on the second stimulable phosphor sheet 52, is obtained. The low energy image signal S2 is stored in the internal memory of the image processing unit 120.

The image processing unit 120 performs the normalization processing on the high energy image signal S1 and the low energy image signal S2, which have been stored in the internal memory, in order to obtain the normalized high energy image signal S1' and the normalized low energy image signal S2'. Also, in the course of the normalization processing, the image processing unit 120 obtains the scale factors Gp1 and Gp2.

The normalized high energy image signal S1' and the normalized low energy image signal S2' are fed from the image processing unit 120 into the internal memory 103 of the energy subtraction processing apparatus 110. Also, the information representing the scale factors Gp1 and Gp2 is fed into the parameter altering means 102. The parameter altering means 102 calculates the ratio (=Gp2/Gp1) of the scale factor Gp2 to the scale factor Gp1. Also, the parameter altering means 102 makes reference to the stored look-up tables and obtains the new parameters Ka', Kb', and Kc', which correspond to the calculated ratio (=Gp2/Gp1). The parameters Ka, Kb, and Kc having been read from the storage means 101 are replaced by the new parameters Ka', Kb', and Kc'. The information representing the new parameters Ka', Kb', and Kc' is fed from the parameter altering means 102 into the energy subtraction processing means 104.

The energy subtraction processing means 104 receives the normalized high energy image signal S1' and the normalized low energy image signal S2' from the internal memory 103. Also, the energy subtraction processing means 104 calculates the energy subtraction image signal Sproc with Formula (5) shown above by utilizing the new parameters Ka', Kb', and Kc', which have been received from the parameter altering means 102.

In the manner described above, the energy subtraction image signal Sproc is calculated in accordance with the parameters having been altered in accordance with the scale factor value ratio representing the contrast ratio between the high energy image and the low energy image, which scale factor value ratio also reflects the degree of the adverse effects of the beam hardening phenomenon and the scattering of radiation. Therefore, the adverse effects of the beam hardening phenomenon and the scattering of radiation are capable of being suppressed more efficiently than with the conventional techniques.

The energy subtraction image signal Sproc having been obtained in the manner described above is fed into the CRT display device 182 and utilized for reproducing the energy subtraction image Pproc. The thus reproduced energy subtraction image Pproc is a visible image, in which the adverse effects of the beam hardening phenomenon have been suppressed sufficiently. The energy subtraction image Pproc thus has good image quality and can serve as an effective tool in, particularly, the efficient and accurate diagnosis of an illness.

In the aforesaid embodiment of the second energy subtraction processing apparatus in accordance with the present invention, the parameter altering means 102 alters the parameters for the energy subtraction processing in accordance with the ratio (=Gp2/Gp1) between the scale factors with respect to the two images to be subjected to the energy subtraction processing. However, the second energy subtraction processing method and the second energy subtraction processing apparatus in accordance with the present invention are not limited to the embodiment described above and may be embodied in various other ways, wherein the parameters for the energy subtraction processing are altered in accordance with the ratio between the processing conditions (particularly, the processing conditions concerning the contrast) for the image processing with respect to the two images subjected to the energy subtraction processing. For example, the parameters may be altered in accordance with the ratio between the latitude value (L value=4/Gp) with respect to one of the two images subjected to the energy subtraction processing and the latitude value (the L value) with respect to the other image. In cases where the parameters for the energy subtraction processing are altered in accordance with the ratio between the latitude values, the parameters may be altered such that, as the ratio (L2/L1) of the latitude value L2 with respect to the low energy image to the latitude value L1 with respect to the high energy image becomes low, the parameters Ka and Kb become large, and the parameter Kc becomes small.

As described above, in the aforesaid embodiment of the second energy subtraction processing apparatus in accordance with the present invention, the parameters are altered such that, as the scale factor ratio (Gp2/Gp1) becomes high, the parameters Ka and Kb become large, and the parameter Kc becomes small. However, in the second energy subtraction processing method and the second energy subtraction processing apparatus in accordance with the present invention, the relationship between the scale factor ratio and the parameters Ka, Kb, and Kc is not limited to the relationship in the aforesaid embodiment of the second energy subtraction processing apparatus.

In the first and second energy subtraction processing methods and apparatuses, the technique for obtaining the plurality of the radiation image signals to be subjected to the energy subtraction processing is not limited to the technique, in which the stimulable phosphor sheet is scanned as in the embodiments described above, and may be, for example, a technique in which a solid-state detector is utilized.

What is claimed is:

1. An energy subtraction processing method, comprising the steps of:
   i) obtaining a plurality of radiation image signals, each of which represents one of a plurality of radiation images of a single object and is made up of a series of image signal components, the plurality of the radiation images of the single object having been formed respectively with a plurality of kinds of radiation having different energy distributions, and
   ii) performing energy subtraction processing in accordance with predetermined parameters and on image signal components of the radiation image signals, which image signal components represent corresponding pixels in the radiation images, a desired tissue pattern embedded in the radiation images being thereby extracted or enhanced,
   wherein the parameters are altered in accordance with signal distributions of main object image areas in the plurality of the radiation images,
   wherein the parameters are altered in accordance with widths of the signal distributions of the main object image areas in the plurality of the radiation images, and
   wherein the parameters are altered in accordance with a ratio between the widths of the signal distributions of the main object areas in the plurality of the rediation images.

2. An energy subtraction processing apparatus, comprising:
   i) means for obtaining a plurality of radiation image signals, each of which represents one of a plurality of radiation images of a single object and is made up of a series of image signal components, the plurality of the radiation images of the single object having been formed respectively with a plurality of kinds of radiation having different energy distributions, and
   ii) means for performing energy subtraction processing in accordance with predetermined parameters and on image signal components of the radiation image signals, which image signal components represent corresponding pixels in the radiation images, a desired tissue pattern embedded in the radiation images being thereby extracted or enhanced,
   wherein the improvement comprises the provision of:
   parameter altering means for altering the parameters in accordance with signal distributions of main object image areas in the plurality of the radiation images,
   wherein the parameter altering means is means for altering the parameters in accordance with widths of the signal distributions of the main object image areas in the plurality of the radiation images, and
   wherein the parameter altering means is means for altering the parameters in accordance with a ratio between the widths of the signal distributions of the main object image areas in the plurality of the radiation images.

3. A method as defined in claim 1 wherein the width of the signal distribution of the main object image area is a value determined by a scale factor value, which represents an input-output transfer ratio of each of the radiation image signals, or by a latitude value of each of the radiation image signals.

4. An apparatus as defined in claim 2 wherein the width of the signal distribution of the main object image area is a value determined by a scale factor value, which represents an input-output transfer ratio of each of the radiation image signals, or by a latitude value of each of the radiation image signals.

* * * * *